(12) United States Patent
Baumann (10) Patent No.: US 7,632,438 B2
(45) Date of Patent: Dec. 15, 2009

(54) INTELLIGENT MANIFOLD AND INJECTION MOLDING MACHINE

(75) Inventor: Martin Baumann, Burlington, VT (US)

(73) Assignee: Husky Injection Molding Systems Ltd. (CA)

( * ) Notice: Subject to any disclaimer, the term of this patent is extended or adjusted under 35 U.S.C. 154(b) by 363 days.

(21) Appl. No.: 11/753,922

(22) Filed: May 25, 2007

(65) Prior Publication Data

US 2008/0290541 A1 Nov. 27, 2008

(51) Int. Cl.
*B29C 45/22* (2006.01)

(52) U.S. Cl. .............. 264/40.1; 264/40.6; 425/135; 425/144; 700/200

(58) Field of Classification Search ............ 264/40.1, 264/40.6; 425/135, 144, 195; 700/200, 202, 700/203
See application file for complete search history.

(56) References Cited

U.S. PATENT DOCUMENTS

| 4,359,435 | A | | 11/1982 | Kogure | |
| 5,795,511 | A | * | 8/1998 | Kalantzis et al. | ........... 264/40.6 |
| 5,898,591 | A | | 4/1999 | Hettinga et al. | |
| 6,330,971 | B1 | | 12/2001 | Jufuku et al. | |
| 6,421,577 | B1 | * | 7/2002 | Triplett | ................ 700/204 |
| 6,529,796 | B1 | * | 3/2003 | Kroeger et al. | ............. 700/202 |
| 2002/0013642 | A1 | * | 1/2002 | Choi et al. | .................. 700/275 |
| 2004/0258787 | A1 | | 12/2004 | Olaru et al. | |
| 2006/0068049 | A1 | | 3/2006 | Nishizawa | |
| 2006/0082009 | A1 | | 4/2006 | Quail et al. | |
| 2008/0152747 | A1 | * | 6/2008 | Feick | ........................ 425/144 |

FOREIGN PATENT DOCUMENTS

JP 62233220 A 10/1987
JP 9104037 A 4/1997

* cited by examiner

*Primary Examiner*—Jill L Heitbrink (57) ABSTRACT

An injection molding machine system includes a hot runner comprising a memory device configured to contain at least one process control parameter. The memory device may transmit a signal representative of the process control parameter to a machine controller associated with the injection molding machine system. The machine controller may generate control signal to operate the injection molding machine system based on, at least in part, the signal from the memory device, wherein the at least one memory device is pre-programmed to have the information pertaining to the at least one process control parameter prior to a first run in the injection molding system.

33 Claims, 3 Drawing Sheets

INTELLIGENT MANIFOLD AND INJECTION MOLDING MACHINE

TECHNICAL FIELD

The present disclosure relates to molding systems and more particularly, relates to systems and methods for setting up and optimizing the operation of a molding machine.

BACKGROUND INFORMATION

In a molding operation, whether this be in an injection molding environment or any similar system using platens and molds, molded part quality and the overall efficiency/productivity of the molding machine is affected by a number of factors, including the physical conditions and configuration of the molding system equipment and also the processing conditions under which the molded part is formed. As a result, proper set-up a molding system may allow the molding system to operate at or near its peak efficiency.

One factor that affects the operation and efficiency of a molding system is setting of the process control parameters. The number and type of process control parameters depends on, at least in part, the configuration of the molding system equipment (for example, but not limited to, the number and type of sensors and the type and range of adjustments of the individual components of the molding system), the specifics of the article to be molded (including, but not limited to, the size and shape of the article and the resin(s) used to manufacture the article), the skill/experience of the operator, as well as the requirements of the end user/customer.

Examples of process control parameters include, but are not limited to, temperature, pressure, and flow rate profiles through the various components of the molding machine, mold and injection set-up. In this regard, it will be understood that the resin should be maintained within a range of acceptable temperature and pressure values or the resin may breakdown and deteriorate or begin to solidify. Additionally, cavity filling is subject to numerous process transition points, particularly exemplified by the transition from velocity fill control (in which speed and position of a plunger in the shooting pot is critical) to pressure control (where preform shrinkage is addressed through the controlled injection of additional molten material). More particularly, the transition points are particularly important to preform geometry in heavier preforms where shrinkage is more significant, although it is noted that thin-walled and relatively lightweight preforms (less than about fifty grams) have particular fill control issues especially associated with the geometry and thickness transition between the elongate wall portion and the neck portion of the preform. Indeed, in the pressure hold portion of the cycle, there are usually multiple transitions to decreasing pressure for stipulated hold times for a particular preform geometry. The fill profile does, therefore, have an overall effect on cycle time.

Other process control parameters include, but are not limited to, resin density, the use of colorants or additives and whether the mold's venting system is operating to specification. As will be understood, colorants and additives are the choice of the customer and affect plastification and hence screw throughput capacity. With respect to venting, each cavity initially contains air that must be purged from the cavity during material injection. With a well-maintained and clean mold, higher fill rates are achieved because air vents from the cavity are initially clear from clogging particulate matter, for example PET dust and the like. With the partial or full blockage of the venting system, cavity pressures increase on a cavity-by-cavity basis and, in the extreme, non-purged air from cavities produces both voids in the molded article and short-weight molded products.

Process control parameters may further be affected by the component/set-up of the molding machine. For example, in the exemplary context of an injection molding machine, different components (such as, but not limited to, different plasticizing units with a different throughputs, processing speeds or screw diameters) may affect the set-up and optimization of the molding machine. Additionally, an injection molding machine may or may not include a nozzle mixer, or the nozzle mixer could be different between the test rig and the customer's machine. Furthermore, as regards the accumulation, prior to injection of a shot of plastic melt in a shooting pot (or in front of a reciprocating screw system), the volume of the shooting pot may vary. All of these differing configurations impact process control and optimization.

Also, in the injection molding field and particularly in relation to preform manufacture using PET molds, the customer may modify the mold to produce different components. In terms of stack components, such modification may simply require replacement of a cavity and gate insert, with a neck finish (defined by a neck ring) remaining unchanged. This form of mold conversion would therefore simply change the weight of the preform, since the geometry of the preform is changed by the variation of the length of the cavity or the thickness of the walls of the preform (as principally defined by the cavity). Again, such a change would require the injection molding machine set-up to be re-configured, which re-configuration requires time and expertise.

With any failure to appropriately set-up the process control parameters, the molded articles may include defects (either visually or structural defects), the molding machine may be damaged, and the overall efficiency and productivity of the molding machine may be decreased. Accordingly, it is generally desirable to optimize the process control parameters of the molding machine.

One known method of optimizing a molding machine relies heavily upon the skill, experience, and knowledge of the molding machine operator. In general, the molding machine operator may establish an initial set of process parameters based on the skill, experience, and knowledge of the molding machine operator. The molding machine operator may then monitor the molded part quality and adjust one or more of the process parameters in an effort to optimize the quality of the molded part as well as the overall productivity/efficiency of the molding machine. Unfortunately, the optimization process may take a considerable time even for a skilled molding machine technician.

Other methods and devices have been developed for controlling various aspects of the molding process equipment. For example, U.S. Patent Application No. 2004/0258787 describes in the abstract a control module that is attached to a machine platen of an injection molding machine. The control module is coupled to at least one sensor that reports a value of a processing condition associated with an injection mold and is disposed within the injection mold. The control module is also coupled to at least one controllable device that varies the processing condition of the injection mold and is disposed within the injection mold. The control module collects and processes sensor output, and provides a control signal to at least one controllable device. A display interface module is linked to the control module. The display interface module accepts user-entered data set-points, provides the user-entered data set-points to the control module, and collects the processed sensor output from the control module for display to a user.

It is important to note that the present disclosure is not intended to be limited to a system or method which must satisfy one or more of any stated or implied objects or features of the present disclosure. It is also important to note that the present disclosure is not limited to the preferred, exemplary, or primary embodiment(s) described herein. Modifications and substitutions by one of ordinary skill in the art are considered to be within the scope of the present disclosure, which is not to be limited except by the following claims.

SUMMARY

According to one embodiment, the present disclosure features a hot runner system for use with an injection molding system. The hot runner system may include a manifold comprising a plurality of melt channels including at least one inlet configured to be in fluid communication with a source of molten resin and at least one outlet configured be coupled to at least one nozzle. At least one memory device may be coupled to the manifold and include information pertaining to at least one process control parameter of the injection molding system. The memory device may be configured to transmit a signal to a machine controller associated with the injection molding machine representative of the process control parameter. The memory device may be pre-programmed with processing parameters prior to a first run in an injection molding system (i.e. the memory device may be loaded from the factory already with processing information) or may be programmed after a first run in the injection molding machine system.

According to another embodiment, the present disclosure features an injection molding system. The injection molding system may including a hot runner manifold comprising a plurality of melt channels including at least one inlet configured to be in fluid communication with a source of molten resin and at least one outlet configured be coupled to at least one nozzle. A mold may be configured to receive molten resin from the at least one nozzle and a machine controller may be provided for generating a plurality of control signals to operate the injection molding machine. At least one memory device may be coupled to the hot runner manifold. The memory device may include information pertaining to at least one process control parameter of the injection molding system and may be configured to transmit a signal to the machine controller representative of the at least one process control parameter.

According to yet another embodiment, the present disclosure features a method of controlling the operation of an injection molding machine. The method may comprise providing a memory device coupled to a hot runner manifold with information pertaining to at least one process control parameter of the injection molding system. A signal representative of the process control parameter may be transmitted to a machine controller associated with the injection molding machine. A plurality of control signals may be generated to operate the injection molding machine based on, at least in part, the signal from the at least one memory device.

BRIEF DESCRIPTION OF THE DRAWINGS

These and other features and advantages of the present disclosure will be better understood by reading the following detailed description, taken together with the drawings wherein.

DETAILED DESCRIPTION OF THE PREFERRED EMBODIMENTS

Figure 1:
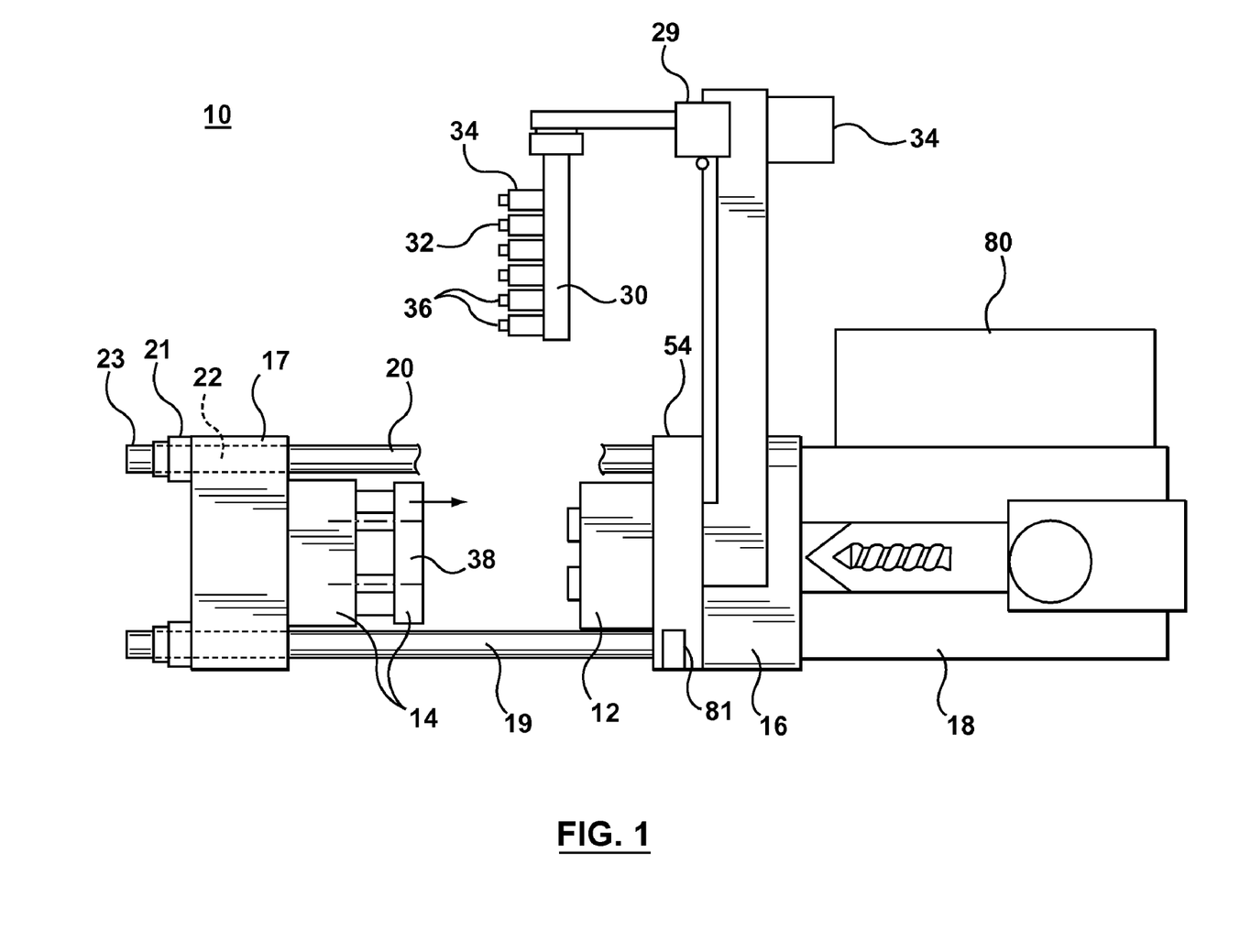
FIG. 1 is one embodiment of an injection molding machine according to the present disclosure.

Referring to FIG. 1, one embodiment of an injection molding machine system 10 according to the present disclosure is shown. As will be explained in greater detail hereinbelow, the injection molding machine system 10 according to the present disclosure may feature a hot runner system 54 comprising memory 81 for storing data related to the operation of the injection molding machine system 10 which may be communicated to and used by a machine controller 80 during the operation of the injection molding machine system 10. The hot runner system 54 and associated memory 81 may allow a customer to set-up and start the injection molding machine system 10 from a pre-set, optimized process parameter configuration instead of leaving this up to the individual operator. The optimized starting parameters may be pre-programmed based on flow simulation or other simulation methods. Alternatively (or in addition), the memory device 81 may be pre-programmed based on information obtained during a test run in a prototype mold or based on previous experience. According to one aspect, the hot runner system 54 (and therefore the mold 12, 14) may be substantially immediately recognized by the machine controller 80 via the memory device 81. As a result, the set-up and operation of the injection molding machine system 10 may be simplified and optimized.

As is well understood by those skilled in the art, the injection molding machine system 10 produces one or more parts substantially corresponding to a mold cavity or cavities (not shown) defined by complementary mold halves 12, 14 located within the injection molding machine system 10 during each injection cycle. Overall operational control of the injection molding machine system 10 may be provided through use of a machine controller 80. The machine controller 80 may include an injection machine controller configured to substantially control the overall functions or operations of the injection molding machine system 10 and/or one or more stand alone controllers that may or may not be connected to the injection molding machine controller for controlling specific functions and/or components of the injection molding machine system 10.

According to one embodiment, the machine controller 80 may include one or more stand alone controllers configured to operate one or more specific components or features of the injection molding machine system 10 such as, but not limited to, temperature control within one more components of the injection molding machine system 10 (for example, the hot runner system 54, nozzles, and/or mold cavities), valve stem actuation control and/or other features or components of the injection molding machine system 10. Additionally, the machine controller 80 may also feature an injection molding machine controller configured to control the remaining functions of the injection molding machine system 10 not controlled by the stand alone controller. The stand alone controller may be configured to receive one or more signals (either across a wire or wirelessly) from the memory device 81 and may adjust one or more process control parameters based on the signals from the memory device 81 and/or other sensors while the injection molding machine controller may be configured to receive signals from one or more sensors and may be configured to output control signals to various components of the injection molding machine system 10.

For the sake of clarity, the injection molding machine controller and the stand alone controller will generally be collectively referred to as simply the machine controller 80. While the machine controller 80 is shown as a signal unit, those skilled in the art will understand that the machine controller 80 may be realized by an architecture having distributed intelligence, i.e., multiple interconnected processors that are responsible for the control of individual parts/components of the injection molding machine system 10. Additionally, the machine controller 80 may also comprise a human machine interface (such as, but not limited to, a graphical user interface or the like) that may present information to the user (such as the present or historic status of the injection molding machine system 10) and/or allow the user to input data/commands into the machine controller 80 through a touch-screen, keyboard, readable data device (such as a disk drive, CD-ROM, flash memory) and the like. The machine controller 80 may include any suitable control logic and application specific management functions and may include one or more microprocessors, memory storage devices for accessing and/or storing data, and the like as is well known to those skilled in the art.

While the specific configuration of the injection molding machine 10 may vary depending on the customer's requirements and the intended application, the injection molding machine 10 may comprise, without specific limitation, molding structure, such as a fixed platen 16 and a movable platen 17 as well as an injection unit 18 (such as, but not limited to, an extruder or the like) for plasticizing and injecting material (for example, but not limited to, polymer resins, metal alloy resins, composite resins, and the like). In operation, the movable platen 17 may move relative to the fixed platen 16 by way of one or more stroke cylinders (not shown) or the like. Clamp force is developed in the injection molding machine system 10, as will readily be appreciated, through the use of one or more tie bars 19, 20 and one or more tie-bar clamping mechanisms 21. The tie-bar clamping mechanism 21 may be fixedly attached to the movable platen 17 (typically through the use of bolts), with each tie-bar clamping mechanism 21 usually extending at least partially into a corresponding bore 22 that extends through the movable platen 17 (for example, at the corners of the movable platen 17). A floating end 23 of the tie bar 19, 20 may be free to move relative to the movable platen 17, with the other remote end anchored into the fixed platen 16. Of course, in certain injection molding machine systems 10, the reverse anchoring methodology may be applied.

Once the tie bar 19, 20 is positively engaged in its respective clamp piston, mold clamp force (i.e., closure tonnage) may be applied through the use of a hydraulic system or the like that may be directly or indirectly associated with the clamp piston. Clamp tonnage may also be generated in different ways, including the use of a toggle-clamp arrangement, as will be appreciated by those skilled in the art.

The mold halves 12, 14 together constitute a mold generally having one or more mold cavities (not shown for clarity) with the mold halves 12, 14 each located in one of the movable platen 17 and the fixed platen 16. Optionally, a robot 29 may be provided to carry an end of arm tool (EOAT) 30, such as a vacuum-based take-out plate 32 or the like. Alternatively (or in addition to), the injection molding machine system 10 may comprise a stripper plate, actuator, and/or rods 38 which urge the molded part 36 away from the mold halves 12, 14. The molded parts 36 may then simply drop into a collection tray, conveyer belt, or the like (not shown).

Figure 2:
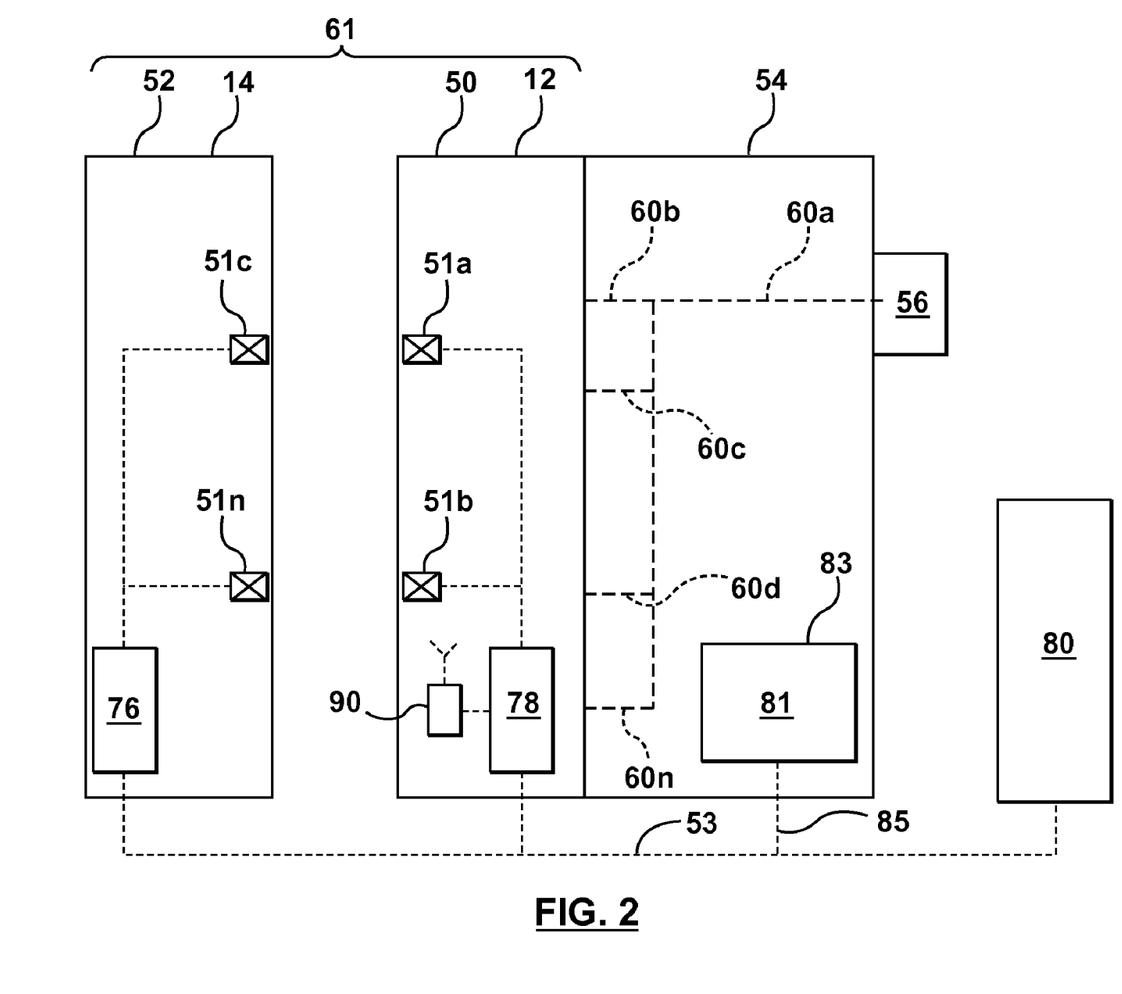
FIG. 2 is a schematic diagram of one embodiment of an intelligent molding system according to the present disclosure.

Referring specifically to FIG. 2, one embodiment of the hot runner system 54 and mold halves 12, 14 is shown schematically. For the sake of clarity, the remaining portions of the injection molding machine system 10 (including its platens onto which mold halves 12, 14 are fixed) has been omitted. A mold 61 may be formed from a hot half 50 and a cold half 52. The hot half 50 may be secured to a hot runner manifold 54 and may include one or more cavities (not shown) that receive, in use, correspondingly aligned cores (not shown) located on the cold half 52 as is well known. The cavities may be in fluid communication with the hot runner system 54 to receive resin as is well known.

The mold 61 may optionally include one or more sensors 51a-51n operatively connected to the one or more of the mold halves 12, 14 for generating at least one signal representative of one or more process control parameters (such as, but not limited to, temperature, pressure, flow rate, strain, and the like). The sensors 51a-51n may be in either direct or indirect contact with the resin and/or the cavities. Optionally, at least one of the hot half 50 and/or cold half 52 may include at least one memory device 76, 78 for storing information/data related to the operation and/or set-up of the mold 61 and/or injection molding machine system 10 as described in U.S. patent application Ser. No. 10/968,610, filed Oct. 19, 2004, which is fully incorporated herein by reference. The information/data contained in the memory 76, 78 may be transmitted to the machine controller 80 across one or more wires 53 or wirelessly (for example, using radio frequency "RF" transmitter 90 or the like).

Figure 3:
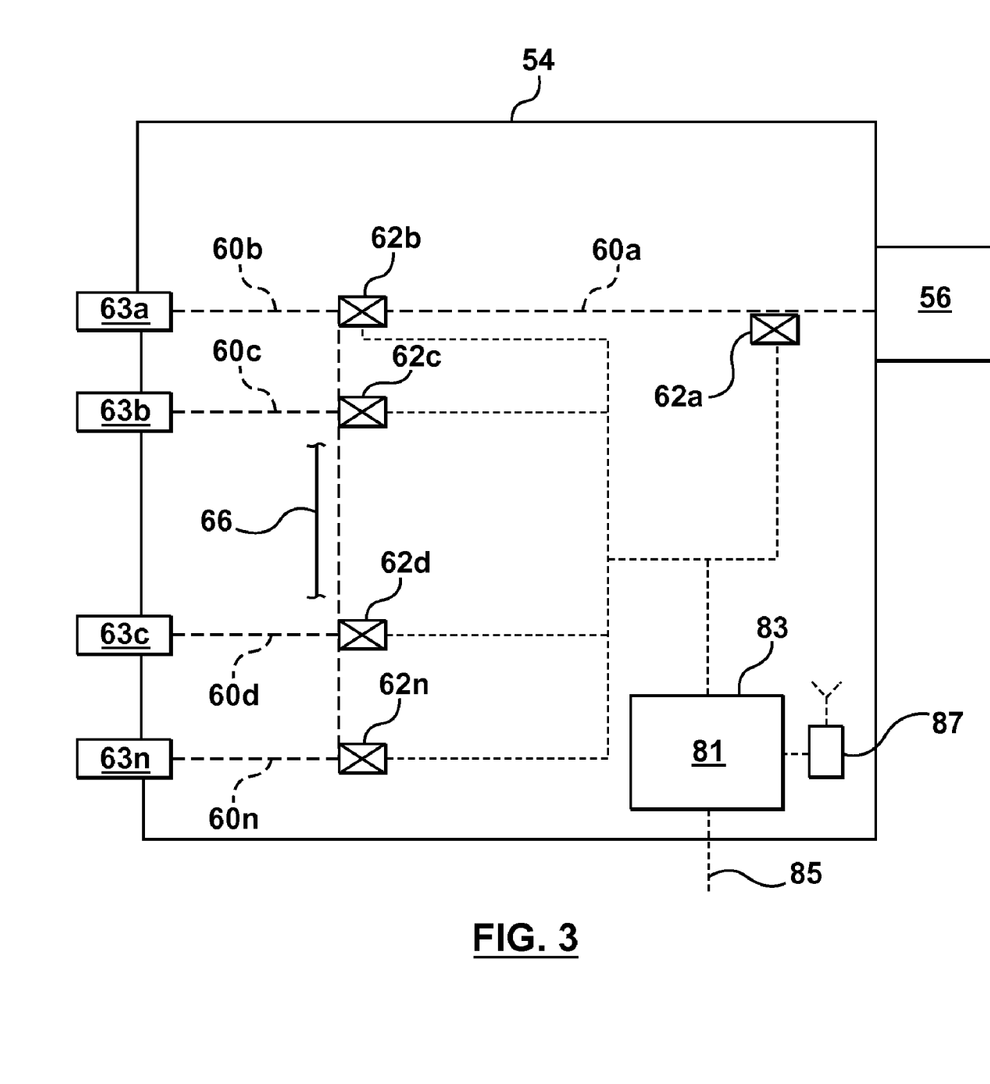
FIG. 3 is one embodiment of a hot runner manifold including a memory device according to the present disclosure.

The hot runner manifold 54, FIGS. 2 and 3, may receive resin from an injection unit (not shown) through a suitable sprue bushing 56 or the like and distribute the resin through one or more melt channels 60a-60n to one or more nozzles 63a-63n (FIG. 3) which may regulate the flow of resin into the mold 61. The hot runner manifold 54 may also comprise one or more heat regulators 66 (such as, but not limited to, a resistive heater, cooling channel, and/or heat transfer channel, only a portion of which is shown for clarity) which may be in close proximity to one or more portions of the melt channels 60a-60n. The machine controller 80 may be operatively connected to the heat regulators 66 to control the temperature of the resin within the melt channels 60a-60n. For example, the machine controller 80 may be operatively connected to a power supply (not shown) and may regulate the voltage applied to one or more heat regulators 66. According to one aspect, a plurality of heat regulators 66 may be provided defining a plurality of heat zones corresponding to various portions of the melt channels 60a-60n within the hot runner system 54.

The hot runner manifold 54 may also be provided with one or more sensors 62a-62n configured to generate signals representative of one or more process control parameters (such as, but not limited to, temperature, pressure, flow rate, strain, and the like). The number, type, and location of the sensors 62a-62n will depend upon the intended application and the physical constraints of the hot runner manifold 54 (for example, the amount of physical space available, the ability to interconnect the sensors, and the type/number of control process parameters needed for effective control) and is considered within the knowledge of one of ordinary skill in the art. The sensors 62a-62n may be surface mounted, embedded within the hot runner manifold 54, or the like.

The hot runner manifold 54 may further comprise one or more memory devices 81 for storing information/data related to the hot runner manifold 54 and/or any other component of the injection molding machine system 10 which may be communicated to and used by a machine controller 80 during the operation and/or set-up of the injection molding machine system 10. The hot runner manifold 54 and associated memory device 81 may allow a customer to set-up and start the injection molding machine system 10 from a pre-selected, optimized set of process parameter configuration instead of leaving this up to the individual operator. As a result, the set-up and operation of the injection molding machine system 10 may be simplified and optimized. In addition, the memory device 81 may allow the hot runner manifold 54 to retain optimized process control parameters unique to the hot runner manifold 54 while allowing the hot runner manifold 54 to be able to work with virtually any machine controller 80.

The memory device 81 may be located in a cavity 83 or the like within the hot runner manifold 54 and/or may be secured to one or more sides of the hot runner manifold 54. The memory device 81 may be coupled to the machine controller 80 through one or more wires, field bus, or the like 85 and/or through wireless technology (such as, but not limited to, radio frequency "RF" technology such as RF transmitter 87). The information stored on the memory device 81 may also be accessed through a bar code scanner or the like configured to be coupled to the machine controller 80.

The memory device 81 may comprise any device for storing data and/or instructions and may be read-only or writeable. For example, the memory device 81 may include non-volatile memory storage technology such as optical storage or a magnetic medium storage including, but not limited to, P-TAG, Datakey, and RS-485 multi-drop technologies. According to one embodiment, the memory device 81 may operate separately and independently from the sensors 62a-62n.

In the preferred embodiment, the memory device 81 may contain data and/or instructions related to the operation the hot runner manifold 54 and/or any other component of the injection molding machine system 10. Alternatively, the data stored in the memory device 81 may comprise a pointer or the like which directs the machine controller 80 to a database containing information related to the operation the hot runner manifold 54, and/or any other component of the injection molding machine system 10. The database may be located either at the customer's premises and even within memory allocated to the machine controller 80, or may be remotely located off-site, e.g. at the supplier/manufacturer of the hot runner manifold 54.

The database may contain a listing of supplied machines and their associated (and preferably optimized) operational parameters which can be selectively accessed and downloaded to the machine controller 80 of the local injection molding machine system 10. The database may also be periodically updated with operational information and sensed measurements from the injection molding machine system 10, thus allowing off-line analysis of the operational conditions experienced by the injection molding machine system 10 or specific components thereof. The pointer may include an internet type pointer and/or an intranet pointer.

As discussed above, the data contained on the memory device 81 may be communicated to the machine controller 80 which may then adjust one or more process parameters of the hot runner system 54 and/or any other component of the injection molding machine system 10. The data may be related to set-up and/or steady-state operating instructions/parameters for the machine controller 80 and/or instruction/parameters for the injection molding machine operator. For example, the data may comprise instructions on how to verify that the injection molding machine system 10 is properly assembled, initial set-up and/or steady-state operation process control parameters (e.g., but not limited to, temperature and/or pressure profiles), as well as an instruction manual and related technical data.

The initial process control parameters stored on the memory device 81 may be set by the manufacturer of the hot runner manifold 54 or by an independent organization prior to use by the ultimate customer. The initial process control parameters may be utilized as a set of baseline settings upon which further optimization (if desired by the ultimate consumer) may be based. According to one aspect, the initial process control parameters may be set such that the injection molding machine system 10 may at least operate at a minimum efficiency level which may be set and/or determined by either the manufacturer of the hot runner manifold 54 and/or injection molding machine system 10, by an independent organization, or the customer. In this regard, the hot runner manifold 54 according to the present disclosure may function as a "plug and play" type device which may not require the ultimate end user of the hot runner manifold 54 to create a set of baseline operating parameters.

Because of the inherent variations in operating conditions due to materials differences, changes in the intended operating conditions, and machine variations, it may be desirable for the end user to further optimize and/or adjust one or more of the process control parameters stored on the memory device 81. These changes in the process control parameters may be stored in the memory device 81 as a new file and/or may erase the old settings. Alternatively (or in addition), the new process control parameters may be communicated to the database and/or the manufacturer/independent organization which may then utilize this information for later systems.

The process control parameters may include, but are not limited to, one or more of the follow: temperature and/or heat profiles associated with the hot runner manifold 54; temperature and/or heat profiles associated with the sprue bushing 56; temperature and/or heat profiles associated with the nozzles 63a-63n; temperature and/or heat profiles associated with the mold 61; temperature and/or heat profiles associated with other components of the injection molding machine system 10; information regarding the article to be molded; information regarding the resin(s) being injected; resin flow rates within the various components of the injection molding machine system 10; injection/filling velocity profiles; packing pressure magnitudes; gate freeze determination and pressure profiles; timing for the opening and/or closing of the valves 63a-63n; maintenance performed and/or due on the various components of the injection molding machine system 10; cooling information for the mold 61; injection time; hold time; screw position information; number of shots; and the like. For example, the process control parameters may include a plurality of temperature profiles for a plurality of temperature zones within the hot runner manifold 54. The plurality of temperature zones may correspond to various portions of the melt channels 60a-60n of the hot runner manifold 54.

The memory device 81 of the hot runner manifold 54 may be coupled (either one way or two way) with other components of the injection molding machine system 10. The memory device 81 may receive information/data relevant to the other components. The information received by the memory device 81 may be generic or may be specific to the components. For example, the memory device 81 may receive data from the mold 61 regarding the size, configuration, and/or number of cavities as well as the type(s) of resin, etc. Based on this information, the memory device 81 may then adjust one or more of the process control parameters such that the ultimate process control parameter settings transmitted to the machine controller 80 are customized to the specific application. The memory device 81 may include a database which may be accessed to correlate the received information.

For example, the size of the cavities may be changed which may require a change in the size of the nozzle 63a-63n and the flow rate to compensate for the larger injection shots. The memory device 81 may automatically sense that the mold 61, nozzles 63a-63n, and/or the injection unit 18 have been changed and make adjustments to one or more of the process control parameters. In this manner, the memory device 81 may automatically make adjustments in the event that one or more of the components of the injection molding machine system 10 are changed from the initial set-up.

Turning now to the operation of the various embodiments of the present disclosure, the process control data may be loaded onto the memory device 81 of the hot runner manifold 54 (for example, but not limited to, by the manufacturer of the hot runner manifold 54 and/or the injection molding machine system 10) as discussed above. The end consumer may provide data regarding the various components which will be utilized with the hot runner system 54. Alternatively, the manufacturer of the hot runner manifold 54 may provide the end customer with the entire injection molding machine system 10 or a part thereof (for example, but not limited to, the hot runner manifold 54, nozzles 63a-63n, and mold 61). The process control data may be determined experimentally, empirically, and/or using any known process relationship(s) and analysis and may be based on, at least in part, information regarding a specific configuration of the injection molding machine system 10 and/or a plurality of different configurations of the injection molding machine system 10. For example, the process control data stored on the memory device 81 of the hot runner manifold 54 may include, but is not limited to, temperature profiles for one or more different zones within the hot runner system 54 and/or any of the parameters discussed above. The process control data may be determined based on all or part of the information available in order to create one or more optimized process control parameters. As described above, the term "optimized" is intended to mean that the efficiency and/or productivity of the injection molding machine system 10 meets at least a certain minimum threshold. This minimum threshold may be set and/or determined by the manufacturer of the hot runner manifold 54 and/or injection molding machine system 10, the purchaser, a third party organization, and/or the consumer of the injection molding machine system 10.

Various components of the injection molding machine system 10 may be assembled at a user's location and the injection molding machine system 10 may be started. The machine controller 80 may request direct entry of certain information/data related to the operation of the injection molding machine system 10. This data may be directly entered into the machine controller 80 by the mold machine operator or loaded from an external storage device such as, but not limited to, an optical storage device (DVD, CD, or the like), flash drives, and the like.

Data related to the operation of the injection molding machine system 10 may be optionally transmitted from other components of the injection molding machine system 10. The data may be transmitted directly to the machine controller 80 or to the hot runner manifold 54 (and specifically the memory device 81) which may passively retransmit the data and/or calculate one or more process control parameters and/or instructions based on, at least in part, the received data using one or more parameter control algorithms stored in the memory device 81 and/or a databases correlating the received data with one or more process control parameters.

Data may be transmitted from memory device 81 of hot runner manifold 54 to machine controller 80. This can either be initiated by the memory device 81 of the hot runner manifold 54 or by the machine controller 80. This information may be generic to hot runner manifold 54 and/or one or more of the other components of the injection molding machine system 10. The information may also include details regarding the specific articles to be molded such as, but not limited to, resin(s), size, shape, and the like. The information transmitted to the machine controller 80 may also comprise data related to temperature and/or pressure profiles within the hot runner system 54.

The machine controller 80 may receive the data from the memory device 81 of the hot runner manifold 54 and/or the other various components of the injection molding machine system 10. The data from the memory device 81 of the hot runner manifold 54 may comprise commands/instructions for the machine controller 80 to perform/execute and/or may comprise data which the control algorithms of the machine controller 80 may process to create one or more process control parameter profiles and output commands/signals to control the various components of the injection molding machine system 10. While not a limitation, the machine controller 80 may output signals to control the injection unit 18, the heat regulators (for example, but not limited to, heat regulators associated with the hot runner manifold 54, the mold 61, sprue bushing 56, nozzles 63a-63n, and the like), the nozzles 63a-63n and the like.

Once the injection molding machine system 10 has begun operating, the machine controller 80 may receive signals from the various sensors 51a-51n, 62a-62n of the injection molding machine system 10 in real time. The machine controller 80 may operate in either an open and/or closed loop configuration as is known. The machine controller 80 may optionally make dynamic adjustments to one or more of the process control parameters to compensate for deviations/changes in the operating conditions of the injection molding machine system 10.

As mentioned above, the present disclosure is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A hot runner system for use with an injection molding machine system, said hot runner system comprising:
   a manifold comprising a plurality of melt channels including at least one inlet configured to be in fluid communication with a source of molten resin and at least one outlet configured be coupled to at least one nozzle; and
   at least one memory device coupled to said manifold, said at least one memory device including information pertaining to at least one process control parameter of said injection molding machine system, said at least one memory device further configured to transmit a signal to a machine controller associated with said injection molding machine system representative of said at least one process control parameter, wherein the at least one memory device is pre-programmed to have the information pertaining to the at least one process control parameter prior to a first run in the injection molding system.

2. The hot runner system of claim 1, wherein:

said machine controller comprises a stand alone controller and wherein said at least one memory device is configured to transmit said signal directly to stand along controller.

3. The hot runner system of claim 2, further comprising: an injection molding machine controller.

4. The hot runner system of claim 3, wherein:

said stand alone controller is configured to transmit a single directly to said injection molding machine controller.

5. The hot runner system of claim 1, wherein:

said machine controller includes an injection molding machine controller and wherein said at least one memory device is configured to transmit said signal directly to stand along controller.

6. The hot runner system of claim 1, wherein:

said at least one process control parameter comprises a plurality of temperature profiles of said plurality of melt channels.

7. The hot runner system of claim 1, wherein:

said at least one process control parameter comprises a temperature profile of a sprue bushing.

8. The hot runner system of claim 1, wherein:

said at least one process control parameter comprises a temperature profile of said at least one nozzle.

9. The hot runner system of claim 1, wherein:

said at least one process control parameter comprises mold set-up data.

10. The hot runner system of claim 9, wherein:

said mold set-up data includes resin flow rate data.

11. The hot runner system of claim 9, wherein:

said mold set-up data includes at least one selected from the group consisting of injection velocity profiles, packing pressure magnitudes, gate freeze determination and pressure profiles, and timing for opening and closing of at least one valve.

12. The hot runner system of claim 1, wherein:

said at least one process control parameter further includes maintenance data.

13. The hot runner system of claim 1, wherein:

said manifold further comprises at least one sensor configured to provide a signal representative of said at least one process control parameter, wherein said at least one memory device is configured to receive said signal from said at least one sensor.

14. The hot runner system of claim 13, wherein:

said at least one memory device is configured to transmit a signal representative of said signal from said at least one sensor to said machine controller.

15. The hot runner system of claim 1, wherein:

said at least one process control parameter includes a pointer to a database coupled to said machine controller.

16. An injection molding machine system, comprising:

a hot runner system having a hot runner manifold comprising a plurality of melt channels including at least one inlet configured to be in fluid communication with a source of molten resin and at least one outlet configured be coupled to at least one nozzle;

a mold configured to receive molten resin from said at least one nozzle;

a machine controller for generating a plurality of control signals to operate said injection molding machine system; and at least one memory device coupled to said hot runner manifold, said at least one memory device including information pertaining to at least one process control parameter of said injection molding machine system and configured to transmit a signal to said machine controller representative of said at least one process control parameter, wherein the at least one memory device is pre-programmed to have the information pertaining to the at least one process control parameter prior to a first run in the injection molding system.

17. The injection molding machine system of claim 16, wherein:

said machine controller is responsive to, at least in part, said signal from said at least one memory device.

18. The injection molding machine system of claim 16, wherein:

said machine controller comprises a stand alone controller and wherein said at least one memory device is configured to transmit said signal directly to stand along controller.

19. The injection molding machine system of claim 18, further comprising:

an injection molding machine controller.

20. The injection molding machine system of claim 19, wherein:

said stand alone controller is configured to transmit a single directly to said injection molding machine controller.

21. The injection molding machine system of claim 16, wherein:

said machine controller includes an injection molding machine controller and wherein said at least one memory device is configured to transmit said signal directly to stand along controller.

22. The injection molding machine system of claim 17, wherein:

said at least one process control parameter comprises a plurality of temperature profiles of said plurality of melt channels.

23. The injection molding machine system of claim 17, wherein:

said at least one process control parameter comprises a temperature profile of a sprue bushing.

24. The injection molding machine system of claim 17, wherein:

said at least one process control parameter comprises a temperature profile of said at least one nozzle.

25. The injection molding machine system of claim 17, wherein:

said at least one process control parameter comprises mold set-up data.

26. The injection molding machine system of claim 17, further comprising:

at least one sensor configured to provide a signal representative of said at least one process control parameter, wherein said at least one memory device is configured to receive said signal from said at least one sensor.

27. The injection molding machine system of claim 17, wherein:

said at least one memory device is configured to transmit a signal representative of said signal from at least one sensor to said machine controller.

28. A method of controlling operation of an injection molding machine system, the method comprising:
- providing at least one memory device coupled to a hot runner manifold of a hot runner system with information pertaining to at least one process control parameter of said injection molding machine system, the hot runner manifold comprising a plurality of melt channels, wherein the at least one memory device is pre-programmed to have the information pertaining to the at least one process control parameter prior to a first run in the injection molding system;
- transmitting a signal representative of said at least one process control parameter to a machine controller associated with said injection molding machine system; and
- generating a plurality of control signals to operate said injection molding machine system based on, at least in part, said signal from said at least one memory device.

29. The method of claim 28, wherein:
said at least one process control parameter comprises a plurality of temperature profiles of said plurality of melt channels.

30. The method of claim 28, wherein:
said at least one process control parameter comprises a temperature profile of a sprue bushing.

31. The method of claim 28, wherein:
said at least one process control parameter comprises a temperature profile of at least one nozzle.

32. The method of claim 28, wherein:
said at least one process control parameter comprises mold set-up data.

33. The method of claim 28, further comprising:
receiving a signal generated by at least one sensor coupled to said injection molding machine system at said at least one memory device.

* * * * *